(12) United States Patent
McDonald et al.

(10) Patent No.: US 11,360,774 B2
(45) Date of Patent: Jun. 14, 2022

(54) DUAL BRANCH FORMAT

(71) Applicant: CENTAUR TECHNOLOGY, INC., Austin, TX (US)

(72) Inventors: Thomas C. McDonald, Austin, TX (US); John Duncan, Austin, TX (US)

(73) Assignee: CENTAUR TECHNOLOGY, INC., Austin, TX (US)

(*) Notice: Subject to any disclaimer, the term of this patent is extended or adjusted under 35 U.S.C. 154(b) by 0 days.

(21) Appl. No.: 17/078,296

(22) Filed: Oct. 23, 2020

(65) Prior Publication Data
US 2022/0129278 A1    Apr. 28, 2022

(51) Int. Cl.
*G06F 9/38* (2018.01)

(52) U.S. Cl.
CPC .......... *G06F 9/3818* (2013.01); *G06F 9/3844* (2013.01)

(58) Field of Classification Search
CPC ...... G06F 9/3818; G06F 9/382; G06F 9/3885; G06F 9/3844; G06F 9/3822
See application file for complete search history.

(56) References Cited

U.S. PATENT DOCUMENTS

| | | | | |
|---|---|---|---|---|
| 6,304,960 B1* | 10/2001 | Yeh | .................... | G06F 9/30072 712/236 |
| 6,799,268 B1* | 9/2004 | Boggs | .................. | G06F 9/3836 712/228 |
| 2002/0194463 A1* | 12/2002 | Henry | .................. | G06F 9/3806 712/239 |
| 2010/0299503 A1* | 11/2010 | McDonald | .......... | G06F 12/0862 712/210 |
| 2011/0016292 A1* | 1/2011 | McDonald | ............ | G06F 9/3844 712/240 |
| 2014/0195790 A1* | 7/2014 | Merten | ................. | G06F 9/3885 712/239 |
| 2017/0161078 A1* | 6/2017 | Altevogt | ............... | G06F 9/3867 |

* cited by examiner

*Primary Examiner* — Courtney P Carmichael-Moody
(74) *Attorney, Agent, or Firm* — McClure, Qualey & Rodack, LLP (57) ABSTRACT

In one embodiment, a branch processing method, comprising: assigning plural branch instructions for a given clock cycle to primary branch information and secondary branch information; routing the primary branch information along a first path having adder logic and the secondary branch information along a second path having no adder logic; and writing the primary branch information including a displacement branch target address to a branch order table (BOT) and the secondary branch information without a target address to the BOT.

20 Claims, 7 Drawing Sheets

DUAL BRANCH FORMAT

TECHNICAL FIELD

The present invention relates in general to microprocessors, and in particular, branch prediction in microprocessors.

BACKGROUND

Microprocessors today operate using a pipelined processing scheme whereby programming instructions are broken down into steps that are carried out concurrently throughout a plurality of stages of the pipeline. Instructions typically (e.g., 10-20% of programming code) comprise branch instructions, or simply branches, which include unconditional branches (e.g., branches that are always taken) and conditional branches (e.g., taken or not taken depending on evaluation of a specified condition). It is generally not known for certain whether a conditional jump will be taken or not taken until the condition has been calculated and the conditional jump has passed the execution stage in the instruction pipeline, which may cause delays in fetching the next instruction. Branch predictors have been developed that attempt to guess, at the front end of the pipeline, which direction a conditional branch will go and to what target address, and in doing so, improve the flow of instructions through the pipeline.

Branch prediction to improve the flow of instructions through the pipeline is of no real value if there are bottlenecks in the rest of the pipeline. Accordingly, microprocessors have been developed to decode and execute two branches per clock cycle. At a decode stage, for instructions that were not predicted by the front end predictors (e.g., by the branch target address cache or BTAC) or even for those that have, the instructions are formatted and target addresses for displacement branches are checked through adder logic for each branch, which adds cost and complexity. Further down the pipeline, updates to the branch prediction tables may present further challenges to flows since additional write ports to the various prediction tables to handle updates based on outputs from two branch execution units results in more hardware, yet a single write or read/write port limits the amount of updates per cycle. Thus, improvements to the pipelined architecture are desired to improve the flow of pipelined instructions and hence the speed and efficiency of execution of the instructions in a microprocessor.

SUMMARY

In one embodiment, a branch processing method, comprising: assigning plural branch instructions for a given clock cycle to primary branch information and secondary branch information; routing the primary branch information along a first path having adder logic and the secondary branch information along a second path having no adder logic; and writing the primary branch information including a displacement branch target address to a branch order table (BOT) and the secondary branch information without a target address to the BOT.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Certain embodiments of a branch processing system and method are disclosed that provide an efficient and reduced hardware design for decoding and updating a pair of branches in a branch unit pipeline for a microprocessor. In one embodiment, a format stage decoding branch unit is configured to write primary and secondary branch information (e.g., branch address, prediction table used, etc.) to a branch order table (BOT), where only logic for checking a target address for a displacement branch for the primary branch information is needed based on assignment of the branch instructions as either primary or secondary branch information. In other words, in view of the assignments, the primary branch information and the secondary branch information are routed along separate pipeline processing paths of different hardware complexity. In some embodiments, the branch processing system further includes two write queues to delay updates to a given branch predictor table (also referred to as an array) with a single write or read/write port when the write or read/write port is currently in use. In one embodiment, the write queues send out only a single update in the case of an expected collision (e.g., a write to the same table or sub-table), wherein a determination of which of multiple updates to write is based on a determination of importance of the branch instruction. Without an expectation of collisions, the write queues each allow for multiple updates for a given clock cycle. Through the assignment and routing of two branch instructions via primary and secondary branch information, and/or the updating of a given predictor table from either one of the write queues in the case of an expected collision based on an importance determination, the instruction bandwidth throughout the pipeline is more evenly matched while improving speed of processing without increasing table sizes (e.g., by adding ports) and reducing hardware complexity in the format stage decoding branch unit.

Digressing briefly, microarchitectures today have developed to concurrently process and send two branch instructions down the branch pipeline for decoding and execution. However, potential bottlenecks may need to be addressed by additional adder (adder logic) hardware and/or multiple predictor table write ports, which adds complexity, cost, and of course, size to the chip. In contrast, certain embodiments of a branch processing system as disclosed herein selectively route branch instructions in a manner that reduces the need for additional adder logic, and/or incorporate two write queues in a branch update stage to eliminate the need for additional predictor table write ports, while ensuring acceptably high performance in the flow of branch instructions throughout the pipeline.

Having summarized certain features of a branch processing system of the present disclosure, reference will now be made in detail to the description of a branch processing system as illustrated in the drawings. While a branch processing system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

Figure 1A:
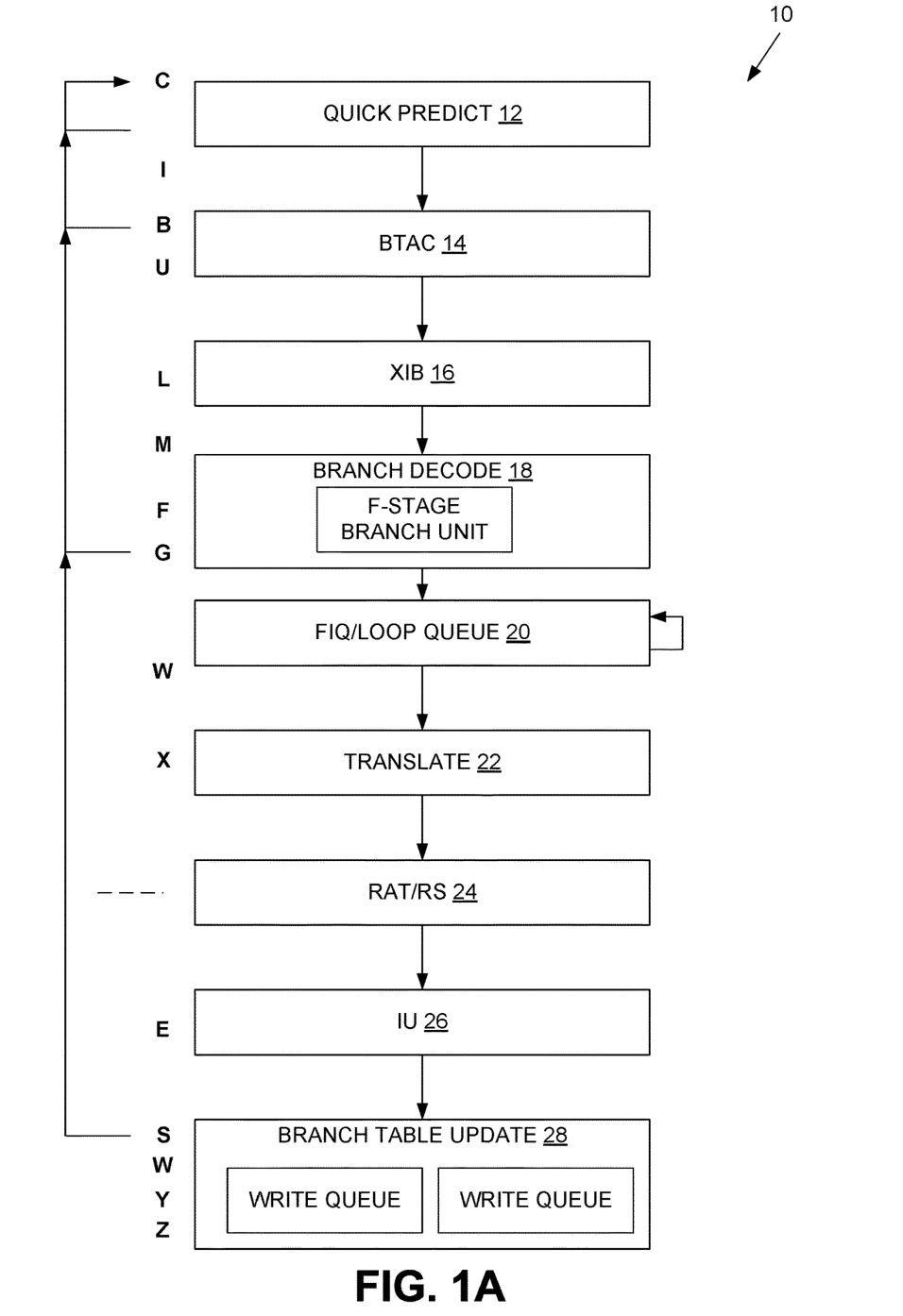
FIG. 1A is a block diagram showing an example branch unit pipeline for a microprocessor in which an embodiment of a branch processing system is implemented.

FIG. 1A shows an embodiment of an example branch unit pipeline for a microprocessor 10. It should be appreciated that certain known components of a microprocessor 10 are omitted here for brevity and ease of explanation and illustration. As is known, the pipeline architecture provides for multiple instructions that are overlapped in execution, with each stage referred to as a pipe stage. The blocks shown in the branch unit pipeline may each be implemented according to one or more stages, those stages shown to the left of the blocks and represented in the depicted embodiment by the upper-case letters C, I, B, U, L, M, F, G, W, X, E, S, W, Y, and Z that are sequentially advanced from top-down and as redirected (as shown by the arrows). It should be appreciated by one having ordinary skill in the art that the number and/or arrangement of stages depicted in FIG. 1A is merely illustrative of one example embodiment, and that in some embodiments, a different number and/or arrangement of stages may be implemented and hence contemplated to be within the scope of the disclosure. It should also be appreciated by one having ordinary skill in the art that the blocks provide a general description of functionality for the branch pipeline, and that associated logic or circuitry known to those having ordinary skill in the art is omitted here for brevity. For instance, it should be appreciated by one having ordinary skill in the art that each stage of the pipeline may be separated by clocked pipeline registers or latches, as is known. As another example, though not explicitly shown in FIG. 1A, it should be appreciated by one having ordinary skill in the art that operations at the front end involve data exchange or interaction with an instruction cache.

An instruction cache is a random access memory device within a microprocessor into which the microprocessor places instructions of an ISA machine language program (such as x86 ISA machine language instructions) that were recently fetched and/or pre-fetched from larger cache (e.g., L2 cache, L3 cache) or system memory (e.g., fetched and/or pre-fetched from DRAM by a bus interface unit) and performed by the microprocessor in the course of running the ISA machine language program. The ISA defines an instruction address register that holds the memory address of the next ISA instruction to be performed (defined by the x86

ISA as an instruction pointer (IP) though sometimes referred to as a program counter (PC)), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data (i.e., that is accessed based on an instruction address register value and on a load/store address, but not exclusively based on a load/store address) is intended to be included in the definition of an instruction cache for purposes of the present disclosure.

Directing attention in particular to the branch unit pipeline of the microprocessor 10 of FIG. 1A, the microprocessor 10 comprises a pipelined microprocessor whose instruction set, in one embodiment, conforms substantially to the x86 architecture instruction set. As will be appreciated by persons having ordinary skill in the art from the description provided herein, the present invention may be implemented in a variety of various circuit configurations and architectures, and the architecture illustrated in FIG. 1A is merely one of many suitable architectures. The example microprocessor 10 comprises a quick predictor 12, branch target address cache (BTAC) 14, instruction byte queue (XIB) 16, branch decoder 18 (comprising format (F) stage decoding branch unit, or also referred to herein as an F-stage branch unit or the like), format instruction queue (FIQ)/loop queue 20, instruction translator 22, register alias table (RAT)/reservation stations (RS) 24, functional units (e.g., integer unit, floating point unit, etc.) 26, and a branch table updater 28 comprising, in one embodiment, two write queues. Each of the numerically-referenced blocks of the microprocessor 10 correspond to logical circuits that are implemented over the corresponding plurality of stages C, I, B, U, L, M, F, G, W, X, E, S, W, Y, and Z, with the pipeline architecture enabling different groups of instructions at every stage. In one embodiment, four or more instructions may be run at every stage, with control signals marking each stage along the pipeline. Stages in association with the quick predictor 12, BTAC 14, and XIB 16 involve accesses to an instruction cache (I-cache, not shown in FIG. 1A).

The quick predictor 12 comprises a single cycle branch predictor that provides for single cycle prediction (e.g., takes one cycle to produce a target address, the prediction provided at the I stage in one embodiment). In one embodiment, the quick predictor 12 comprises a table (also referred to herein as array or target array) that stores branch target addresses of previously executed branch instructions, the table enabling a branch prediction when the stored branch instructions are subsequently encountered. In one embodiment, the table comprises 128 entries, though tables of other sizes (e.g., 64 entries, 32 entries, etc.) may be used in some embodiments. The table is organized as an n-way (e.g., n is an integer greater than one) set associative cache. In one embodiment, each entry stores eight (8), 3-bit counters and the current local branch pattern, the counter chosen by a 3-bit local branch pattern. The quick predictor 12 further comprises a conditional branch predictor that is accessed in parallel with the table and that provides a taken/not taken direction for conditional branches. The quick predictor further comprises a return stack that can provide a target instead of the table. In one embodiment, the return stack comprises four (4) entries and provides the target for return instructions. Note that the specifications listed above are merely for illustration, and that some embodiments may perform under different specifications and hence are contemplated to be within the scope of the invention. The quick predictor 12 is configured to deliver a predicted branch target immediately (within a single cycle) with no taken branch penalty. In some embodiments, the quick predictor 12 may operate according to other specifications for its prediction mechanism and/or table configuration, or in some embodiments, may be omitted. Most branches are correctly predicted by the quick predictor 12. In some embodiments, where the quick predictor 12 provides a branch prediction that differs (e.g., difference in direction and/or target) from the branch prediction of the BTAC 14 based on the same fetched branch instruction, the BTAC 14 overrides the branch prediction of the quick predictor 12 and updates the quick predictor table within the set of stages of the BTAC 14, for instance, at the U stage, with the branch prediction information (e.g., direction, target address, branch prediction type) provided by the BTAC 14.

The I stage and/or B stage correspond to access to the various tables of the branch unit pipeline, including the I-cache, tag arrays, translation lookaside buffer (TLB) arrays, BTAC arrays, return stack arrays, etc., muxing out the direction or way (e.g., based on the tags), and reading out of the instructions.

The BTAC 14 holds information about previously executed branch instructions that it uses to predict the target address, direction, and type during subsequent executions. The BTAC 14 comprises one or more tables that are much larger than the table of the quick predictor 12. In one embodiment, the BTAC 14 comprises a 4k entry, m-way set-associative table (also referred to herein as array or target array), where m is an integer greater than one. Each entry of the BTAC 14 comprises a valid bit, a branch target address prediction, a direction prediction, and a branch type. The branch type specifies whether the branch instruction is a call/return, indirect branch, conditional relative branch, or unconditional relative branch. In one embodiment, the BTAC 14 comprises or cooperates with a conditional relative branch predictor having a multiple entry (e.g., 12k) tagged geometric length (TAGE)-based predictor, multiple tables, a multi-bit (e.g., 3 bit), taken/not taken (T/NT) counter, and multi-bit global branch history. As another example, the indirect prediction comprises a multiple entry (e.g., 1.5k) TAGE predictor and uses the table entries for static indirect branches. Note that in some embodiments, other types of prediction mechanisms may be used, including correlation-based prediction mechanisms, predictors that use a combination of global and local branch history, etc. For each portion, or fetch quantum, of a cache line of the instruction cache (e.g., 16 bytes), the BTAC 14 can hold three entries (e.g., sides A, B, and C, though fewer sides may be used in some embodiments for storing prediction information for fewer branch instructions) that can hold prediction information for up to three branch instructions that may be present in a portion of the cache line. The BTAC 14 comprises operations through a set of stages (e.g., the I, B and U stages). In effect, the U stage of a branch instruction serves as a C stage for the target (e.g., the arrow from the B stage to the C stage reflects the situation of the branch instruction at the B stage and the next clock is the C stage of the target or herein also, the cache address), resulting in a two-clock delay for BTAC prediction.

The BTAC 14 has a two clock taken penalty, which also reveals a benefit of the quick predictor 12 in providing a rapid branch prediction (no taken penalty) by immediately steering the new cache address to be the target. In one embodiment, the BTAC 14, being larger than the quick predictor 12 and having a more sophisticated branch prediction mechanism, is configured to (e.g., always) override the branch prediction of the quick predictor 12 when there is a disagreement in branch prediction (e.g., the BTAC 14 determines a different branch prediction than the taken determination and/or branch target address determined by the quick predictor 12). In some embodiments, the BTAC 14 is configured to update the quick predictor 12 during one of the BTAC stages (e.g., the U stage) by writing the branch prediction information into the table of the quick predictor 12 (and also in the tables of the BTAC 14). In some embodiments, updates to the BTAC 14 are delayed until a branch is executed or retired, where the updates to the BTAC 14 involve writes to a BTAC table and/or a TAGE table. In one embodiment, updates involve target information and/or counter updates, and are performed using two write queues to respectively provide up to two updates in a single clock cycle, as explained further below. However, updates to the quick predictor 12 do not wait that long, occurring during a BTAC stage. Note that branches that are not in the quick predictor 12 are written into the quick predictor 12 two cycles later at a time corresponding to (e.g., during) a BTAC stage.

The XIB 16 is a queue of entries, each of which holds sixteen bytes of data from the instruction cache. For instance, the cache data that comes from the XIB 16 is simply a stream of instruction bytes that comes in sixteen byte blocks, and it is unknown where a given x86 instruction begins or ends within the stream or within a given block given that instructions are of variable length. The XIB 16 comprises known logic to determine and mark the beginning and ending byte of each instruction within the stream and thereby break up the stream of bytes into a stream of x86 instructions, which is provided to and stored in the FIQ/loop queue 20 for processing by the remainder of the microprocessor pipeline. In the L (length) stage, the XIB 16 determines the instruction lengths. In one embodiment, a predecoder (not shown in FIG. 1A) is implemented at the U stage, and is configured to detect potential branch instructions and mark them as such for each instruction byte in the queues. Notably, at this stage, there is ambiguity as to whether a given byte is the start of an instruction. If a byte is an opcode byte of a branch instruction determined at a later (M stage), then the instruction is affirmed as a branch instruction. For instance, the branch decoder 18 comprises an instruction mux (not shown) for muxing instructions in a mux or M stage, where the branch instructions are affirmed as such. The instruction mux also determines (at the M stage) whether each branch instruction comprises primary branch information or secondary branch information, and assigns or designates the branch instruction accordingly. In one embodiment, the instruction mux routes the identified branch instructions along pipeline paths of different hardware complexity according to whether the branch instruction was assigned as primary branch information or secondary branch information. In the F-stage decoding branch unit of the branch decoder 18, a branch target for a displacement branch is checked for only the primary branch information, and the primary branch information (including the checked target for the displacement branch) and secondary branch information (excluding a branch target) are written to a branch order table (BOT), as described further below.

In the F stage, the instructions are formatted as explained above. In one embodiment, the formatted instructions comprise instructions conforming substantially to the x86 architecture instruction set. Also, a determination is made at the M stage whether a given instruction, perhaps marked preliminarily by the predecoder, was indeed a branch or not. For instance, where a miss occurred in the quick predictor 12 or BTAC 14 (e.g., at initial start-up), the branch decoder 18 (e.g., the instruction mux) decides the current instruction is a branch, writes to the BOT, and redirects at stage G the cache address to the new target and update the tables in the front end of the microprocessor 10. In effect, the branch decoder 18 provides for branch prediction when missed at the quick predictor 12 or BTAC 14, where the branch instruction transitions to the target at the C stage. In some circumstances, such as where there are more than a limited or predetermined maximum number of branches per fetch (e.g., more than three per 16 byte fetch) at the BTAC 14, branch prediction for the extra branch is delayed until decode time.

The FIQ/loop queue 20 receives the formatted instructions and buffers them until they can be translated into microinstructions. The FIQ/loop queue 20 also provides for a preliminary decoding and fast looping function (e.g., on a BTAC loop branch, the loop queue is activated and loop instructions are repeatedly sent), the latter represented by the arrow at the right hand side of the block 20.

The W stage provides for an optional extra timing clock.

At the X stage, the instruction translator 22 translates (in the X or translate stage) the formatted instructions stored in the FIQ/loop queue 20 into microinstructions.

The instructions are provided in program order to a register alias table/reservation tables (RAT/RS) 24. The RAT functionality of the RAT/RS 24 maintains and generates dependency information for each instruction. The RAT functionality of the RAT/RS 24 renames the sources and destinations of the instructions onto internal registers, and dispatches the instructions to reservation stations of the RAT/RS 24, which issue the instructions, potentially out of program order, to functional units 26. The functional or execution units 26, which include integer units, execute branch instructions at stage E (execution). Execution units, branch units, and integer units are terms that are used interchangeably herein. In one embodiment, the execution units 26 (e.g., two execution units) execute two branches in a single clock cycle. The execution units 26 also indicate whether the BTAC 14 has correctly predicted the branch instruction.

Results of the execution are provided in one embodiment to a reorder buffer (not shown), which comprises information pertaining to instructions that have been executed. As is known, the reorder buffer keeps the original program order of instructions after instruction issue and allows result serialization during a retire stage. In one embodiment, some of the information traditionally stored in a reorder buffer are instead stored in the BOT, which is of significantly smaller size (e.g., forty-eight (48) entries for the BOT, versus 192 entries in the reorder buffer). For instance, information stored in the BOT may include of 200-250 bits of branch information, such as type of branch, branch patterns, targets, the tables used in the prediction, and cache replacement policy information (e.g., least recently used or LRU). Note that the quantities of bits and/or entries described herein is merely used as an illustrative example, and other values may be used in some embodiments.

The branch table update 28 comprises stages S, W, Y, and Z, and is configured to update (e.g., at the S stage) the various tables at the front end (e.g., BTAC, TAGE) with information about the fully decoded and executed branch instruction (e.g., the final result of the branch). The update may involve, at stages S, W, Y, and Z, a table read, a target address write, and a counter increment or decrement, which may involve some delays. In one embodiment, the branch table update 28 comprises two write queues, each of which can be used for handling up to two updates in a single clock cycle (e.g., to a BTAC table, a TAGE table, or a combination of both). As explained above, the queues enable delays in updates until an opportune time. In one embodiment, in the case of an expected collision, control logic determines, at the opportune time, which of the queued branch information to write to a given table based on a priority scheme (e.g., relative importance).

Figure 1B:
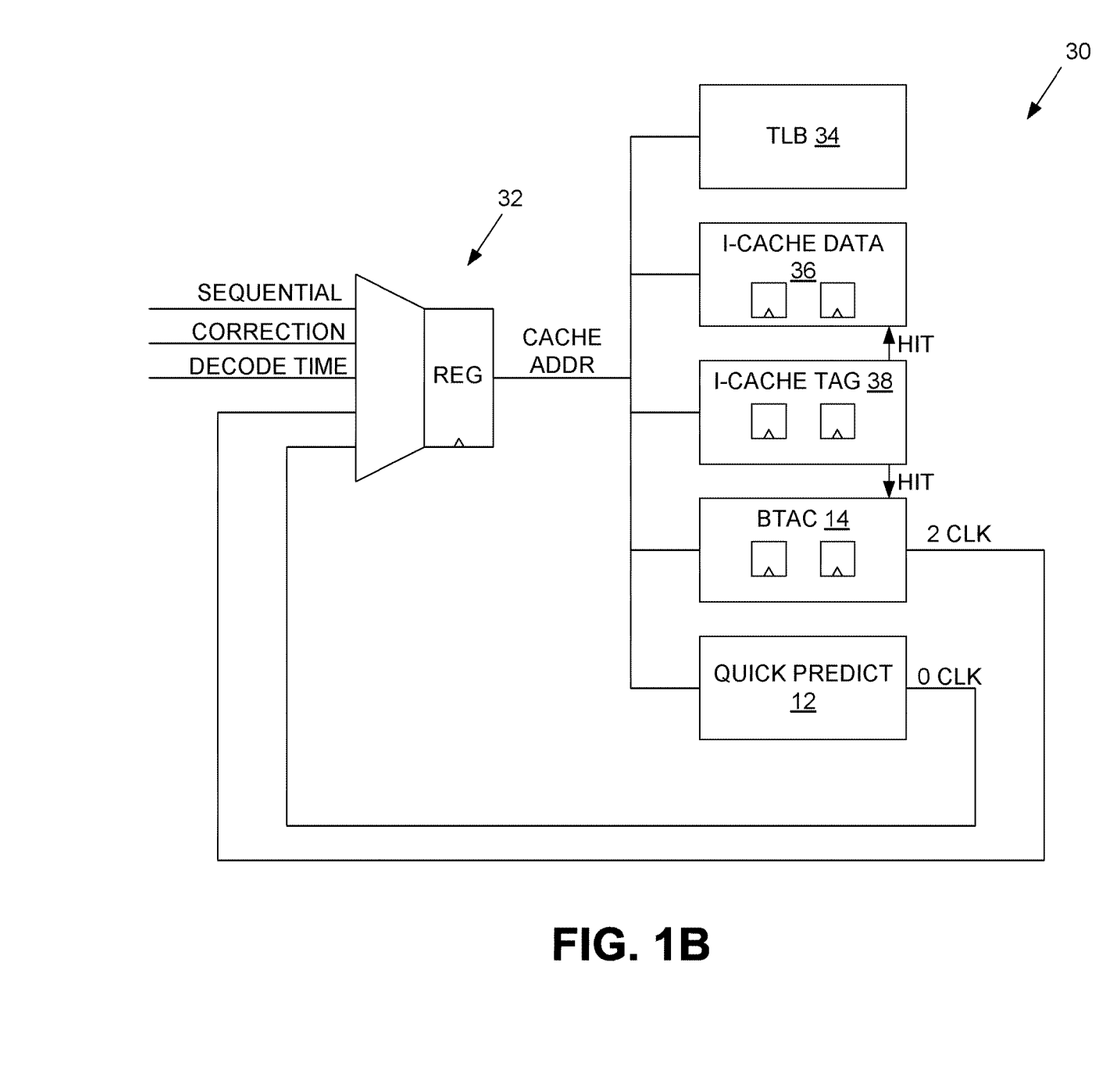
FIG. 1B is a schematic diagram showing an example front end of the branch unit pipeline shown in FIG. 1A.

Referring now to FIG. 1B, with continued reference to FIG. 1A, shown is an example quick predictor 12 and other example sources used at a front end 30 of the branch unit pipeline shown for the microprocessor 10 of FIG. 1A. The front end 30 comprises a fetch unit 32 (e.g., including a mux and clocked register), a translation lookaside buffer (TLB) 34, an instruction cache (I-cache data) 36, I-cache tag 38 (or tag array), the BTAC 14, and the quick predictor 12. The fetch unit 32 receives plural sources of cache instruction addresses, including a sequenced instruction address (e.g., from the I-stage), corrected instruction address (e.g., from the S stage), decode time instruction address (e.g., from the G stage), and addresses from the BTAC 14 and quick predictor 12. The output of the fetch unit 32 is a cache address that is provided as inputs to the TLB 34, I-cache data 36, I-cache tag 38, BTAC 14, and quick predictor 12 for accessing the next instruction of the I-cache data 36.

The TLB 34, under management by a memory management unit (not shown), provides for a virtual to physical page address translation as is known. That is, the TLB 34 stores the physical addresses of the most recently used virtual addresses. The TLB 34 receives a linear address from a segmentation unit (which converts the logical address from a program into the linear address), and a portion of the linear address is compared to the entries of the TLB 34 to find a match. If there is a match, the physical address is calculated from the TLB entry. If there is no match, a page table entry from memory is fetched and placed into the TLB 34.

The I-cache data 36 comprises a level 1 cache of instructions that have been fetched or prefetched from L2, L3 or main memory. The I-cache data 36 comprises multiple clocked registers.

The I-cache tag 38 comprises an array of tags corresponding to the instructions in the I-cache data 36, and comprises multiple clocked registers, and is used to determine a match between information associated with the fetched cache instruction (e.g., the tag or portion of the cache address) to the I-cache data 36 and BTAC 14.

The BTAC 14 is explained above in association with FIG. 1A, and has multiple clocked registers and a two (2) clock taken penalty. The quick predictor 12, also explained above, has a zero (0) clock taken penalty. For instance, assume fetches along the I-cache at 16 bytes per cycle, and assume a branch instruction at cache address 20 to cache address 95. Note that hexadecimal notation (e.g., 0x0, 0x10, 0x20, etc.) is implied by the address descriptions in this example. Thus, fetches occur at cache address 0, cache address 10, cache address 20 (the branch instruction, but not yet resolved since the BTAC 14 read and mux span multiple cycles, which in some embodiments is the same timing as the I-cache), cache address 30 (relative clock 1), cache address 40 (relative clock 2), and then on the 3rd clock (relative clock 3), the cache instruction fetch is redirected to cache address 95. The taken branch penalty thus comprises two clock cycles in this example, since cache address 30 and 40 occur after the branch. In other words, without the quick predictor 12, the taken branch penalty is always two clocks for this particular design example. With the smaller and faster quick predictor 12, the cache address fetches, in the above example, comprise 0, 10, 20 and 95, with no delay on the cache address and zero taken penalty. As noted above, in some embodiments, the quick predictor 12 may be omitted.

Figure 2A:
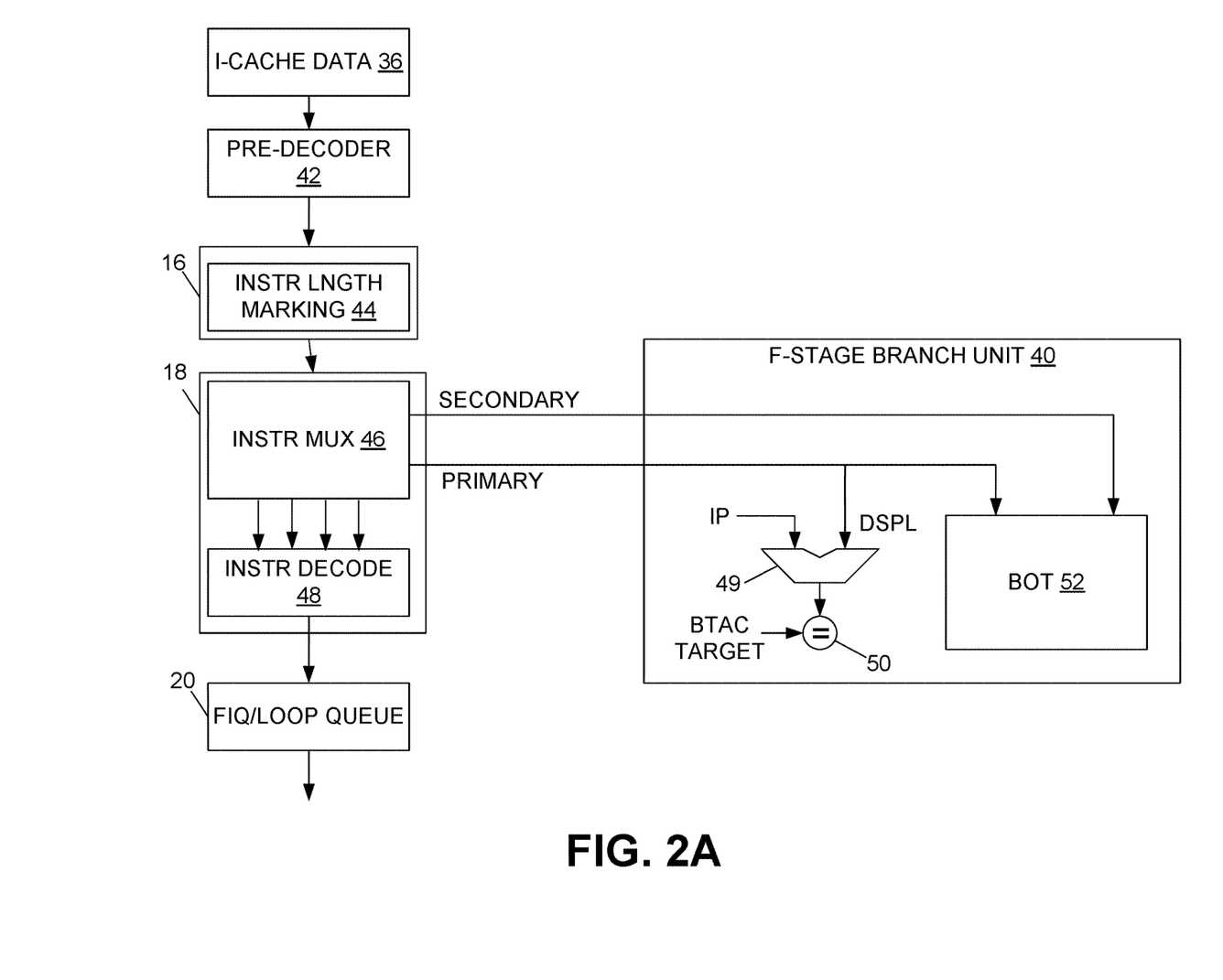
FIG. 2A is a schematic diagram that shows an embodiment of an example format stage branch unit to enable dual branch formatting for an embodiment of a branch processing system.

With continued reference to FIGS. 1A-1B, attention is directed to FIG. 2A, which shows an embodiment of a format (F) stage decoding branch unit 40 that is configured to enable dual branch formatting for an embodiment of a branch processing system. It should be appreciated by one having ordinary skill in the art that the schematic depicted in FIG. 2A is an illustration of one example embodiment, and that some embodiments may provide for a different microarchitecture, including different logic and/or a different arrangement of logic than that depicted to perform similar functionality. Shown is the I-cache data 36, a predecoder 42, the XIB 16 comprising instruction length marking logic 44, the branch decoder 18 comprising an instruction mux 46, the F-stage decoding branch unit 40, and an instruction decoder 48, and the FIQ/loop queue 20.

The instructions coming from the I-cache data 36 may arise from one of several circumstances. For instance, the instructions may be one or more branch instructions not previously encountered, or that were missed at the BTAC 14. Also, the instructions may include branch instructions that are sent through the rest of the pipeline (e.g., XIB 16, branch decoder 18, FIQ/loop queue 20, etc.) for further processing and checks to ultimately undergo processing by the two branch execution units 26 (e.g., check condition codes, check targets ensure proper prediction, etc.) and updates by the branch table update 28. To avoid or mitigate an instruction bandwidth mismatch at the different stages of the pipeline, the decoding of two branches should be followed by the ability to execute two branches. Certain embodiments of the branch processing system are configured to enable this consistent instruction bandwidth through the pipeline.

The predecoder 42 (or pre-decode logic), as explained above, is configured to detect potential branch instructions. Note that in some embodiments, the predecoder 42 may be located elsewhere in the pipeline. The predecoder 42 marks the instructions, including the identification of a branch, prefixes, etc., the pre-decode information attached to the instruction bytes that are fed to the XIB 16. In effect, the predecoder 42 performs a preliminary or partial decoding, whereas the instruction decoder 48 is a full instruction decode.

The XIB 16 comprises instruction length marking logic 44 that is implemented at the L or length stage. Information about branch length marking, to the extent such information is supplemental and consistent with the teachings of the present disclosure, may be found in U.S. Pat. No. 8,473,862, herein incorporated by reference.

The branch decoder 18 comprises the instruction mux or instruction mux logic 46 (mux or M stage), the F-stage decoding branch unit 40, and instruction decode logic 48, implemented in one embodiment in stages M, F, and G.

Information about the M and F stages, to the extent such information is supplemental and consistent with the teachings of the present disclosure may be found in U.S. Pat. No. 8,473,862, herein incorporated by reference. The instruction mux 46 is configured to assign or designate branch instructions as either primary branch information or secondary branch information. In one embodiment, the primary branch information comprises the following branches for a given clock cycle: the only branch in the cycle, the first taken branch, an unpredicted branch, or a second not taken branch. In one embodiment, the secondary branch information always comprises the first not taken branch before the other branch for that cycle. The instruction mux logic 46 is further configured to route the primary and secondary branch information to the F-stage decoding branch unit 40, and provides multiple (e.g., four) instructions to the instruction decoder 48 for a full instruction decode processing for delivery to the FIQ/loop queue 20.

In general, the F or formatting stage is an early stage of decoding used to decode the instruction and send the instruction down the pipeline for further processing (e.g., translation, execution, etc.). Any branches predicted (or not predicted) by the BTAC 14 are checked in the F-stage. For instance, self-modifying code or alias addresses may result in a determination that what may have been speculatively predicted as a branch is not actually a branch.

The F-stage decoding branch unit 40 comprises an adder (adder logic) 49 that adds an instruction pointer and displacement extracted from the primary branch information instruction to derive a target address for a displacement branch, a comparator 50 that compares the derived target address with a BTAC target address, and a BOT 52 that stores primary branch information that includes the target address for the displacement branch and secondary branch information that does not include a target address. For the primary branch information, the target address for the displacement branch calculated at the F-stage decoding branch unit 40 is checked against the BTAC target address to ensure that the BTAC-predicted target is correct. If the BTAC 14 provided a wrong branch target address for the displacement branch, the correct target address is updated at the BTAC 14 and the I-cache data 36 is re-directed (signaled at stage G) to the correct target.

The two branches that are formatted by the F-stage decoding branch unit 40 are written into the BOT 52 in a single clock cycle. In one embodiment, only one (displacement branch) target is written to the BOT 52, which is sourced from the primary branch information. The branch information written to the BOT 52 includes branch information such as type of branch, branch pattern information and direction and valids, and in the case of the primary branch information, the displacement branch target address. For instance, only one taken branch is allowed in a given clock cycle, whereas the not taken branch of the secondary information is not ever taken so there is no need to save the target. Whereas two sets of add and comparator logic may enable the processing of two branches per cycle, in certain embodiments of a branch processing system, only the single set of add and comparator logic is used for the primary branch information (since the secondary branch information is always a not taken branch before the other branch). The latter arrangement enables a reduction in hardware (e.g., less adders, less multiplexing, etc.) and faster timing.

At execution, the instructions have an indicator (e.g., tag or address) that references the BOT 52, which is read and used to update the BTAC or TAGE tables.

Figure 2B:
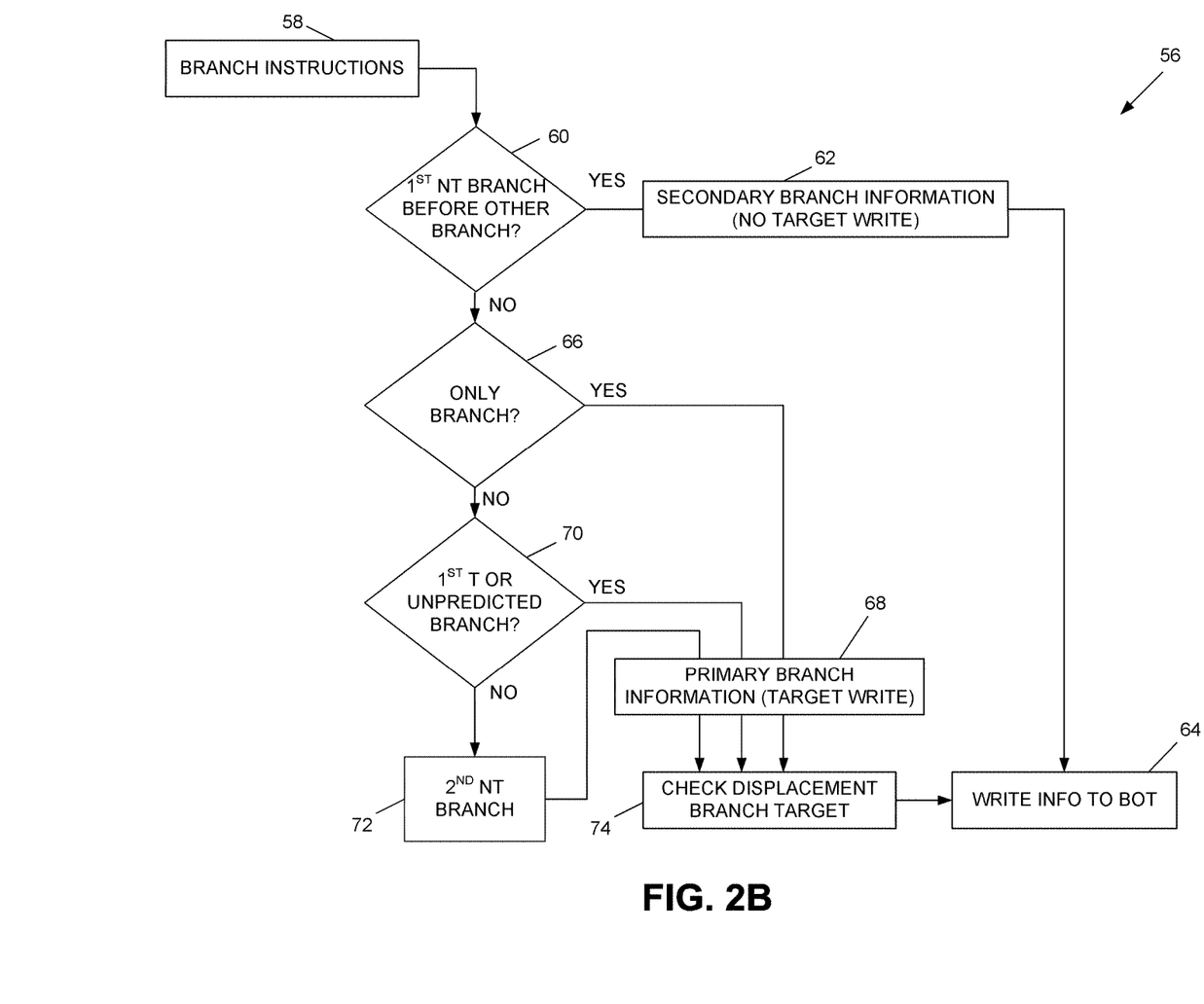
FIG. 2B is a flow diagram that shows an embodiment of an example method of dual branch formatting for an embodiment of a branch processing system.

Referring now to FIG. 2B, shown is an embodiment of an example branch processing method, and in particular, a method of dual branch formatting, denoted as method 56, for an embodiment of a branch processing system. The method 56 receives up to two branch instructions (58) from the I-cache data 36 (FIG. 1B), and determines whether the branch instruction(s) received is a first not taken (NT) branch before the other branch in the clock cycle (60). If so ("yes" for 60), the branch is assigned or, equivalently, designated (e.g., by the instruction mux 46) as secondary branch information (62) and written (with no target) to the BOT (64).

If not ("no" to 60), then a determination is made (e.g., by the instruction mux 46) whether the branch is the only branch for the given clock cycle (66). If so ("yes" to 66), then the branch is designated as primary branch information (68), the target of the displacement branch is checked (e.g., at the F-stage decoding branch unit 40) against the BTAC target (74), and the primary branch information (including the corresponding, checked displacement branch target) is written to the BOT (64).

If not ("no" to 66), then a determination is made (e.g., by the instruction mux 46) whether the branch is the first taken branch or an unpredicted branch (70) for the given clock cycle (70). If so ("yes" to 70), then the branch is designated as primary branch information (68), the target of the displacement branch is checked (e.g., at the F-stage decoding branch unit 40) against the BTAC target (74), and the primary branch information (including the corresponding, checked displacement branch target) is written to the BOT (64).

If not ("no" to 70), then the branch is determined (e.g., by the instruction mux 46) to be a second not taken branch for the given clock cycle (72), and the branch is designated as primary branch information (68), the target of the displacement branch is checked (e.g., at the F-stage decoding branch unit 40) against the BTAC target (74), and the primary branch information (including the corresponding, checked displacement branch target) is written to the BOT (64).

Note that the order of these steps 60, 66, 70, and 72 may be re-arranged in some embodiments, or certain steps may be implemented concurrently (e.g., steps 66-72) in some embodiments. Thus, through this dual branch formatting method 56, only one pipeline processing path of the F-stage decoding branch unit 40 needs to have adder logic to handle processing of the primary branch information (e.g., branch displacement target), and both the primary and secondary branch information are written to the BOT, enabling a reduction is hardware, delays, and complexity (e.g., by using a path for the secondary branch information of reduced complexity).

Figure 3A:
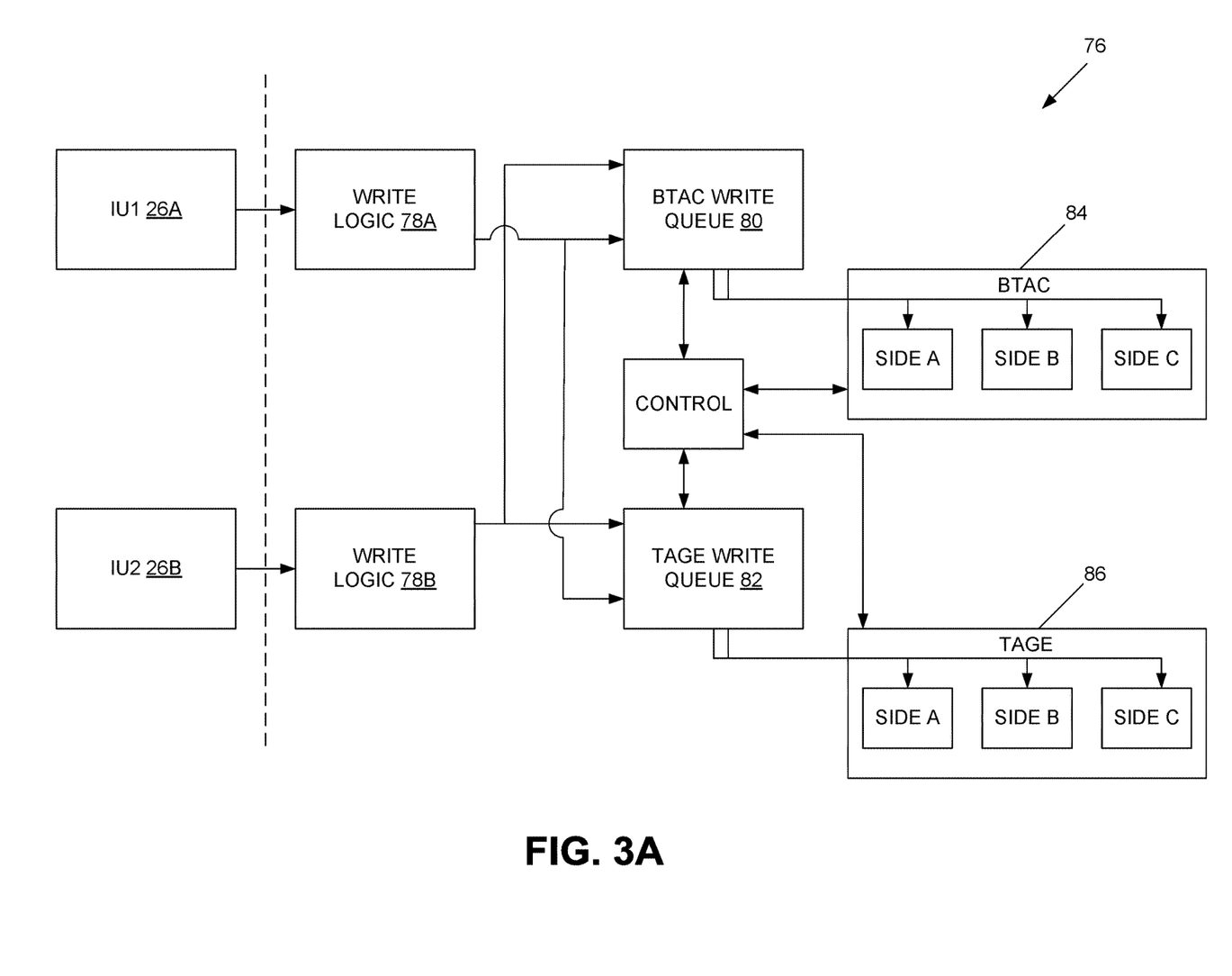
FIG. 3A is a schematic diagram that shows an embodiment of a dual branch updating system for an embodiment of a branch processing system.

The dual branch formatting method 56 and underlying logic shown in FIGS. 2A-2B enable the formatting (in a single cycle) of two branch instructions for enabling execution of two branch instructions in parallel. Attention is now directed to FIG. 3A, which shows an embodiment of a dual branch updating system 76 for an embodiment of a branch processing system. The dual branch updating system 76 continues the benefit of processing two branch instructions at a time by using two write queues to delay writes to a single port while front end reads are in progress, while enabling up to two updates per write queue to the tables of the branch predictors (e.g., BTAC, TAGE). For instance, writes may be delayed until a cycle where there is no valid read access in the front end (e.g., a front end stall). As explained above, branch predictors having tables (and even sub-tables) with only one respective write or read/write port provides a benefit in reduction in table size (when compared to arrays or tables with two write ports, for instance a doubling in size of a table when going from a single write port to two write ports), but also presents challenges to updates when the update involves more than one branch instruction (e.g., delays or bottlenecks). As explained further below, certain embodiments of a dual branch updating system 76 addresses one or more of these challenges by using two write queues, each of which is capable of writing up to two updates. In one embodiment, control logic in communication with the branch table update logic and predictor logic tables, evaluates the potential for collisions (e.g., writes of two branches to the same table, or sub-table), and updates (at an opportune time) from the write queues to the branch predictor tables (or sub-tables) via two branch writes (no expected collision) or a prioritized single write to one of the tables (when there is an expected collision). For instance, one of the write queues sends a single update if there is an expected collision (e.g., same side write to a table) in a bottom two entries of the write queues, the selected update based on the importance of the branch instruction information.

The dual branch updating system 76 comprises write logic 78A, 78B, which receives the branch execution outputs (e.g., misprediction signal and branch tag (e.g., address of the branch in the BOT, which allows access to other branch information, including what side was used in the BTAC or TAGE arrays, what table is used in the conditional predictor, etc.) from the branch units IU1 26A and IU2 26B. Note that the write logic 78A, 78B may be embodied as two instantiations of programming code in some embodiments. The dual branch updating system 76 further comprises two write queues 80 (BTAC) and 82 (TAGE) of the branch table update 28 (FIG. 1), which are each configured to store updates and then at an opportune time, each write two updates to the multi-sided (e.g., side A, side B, and side C) BTAC tables 84, the multi-sided TAGE tables 86 (e.g., side A, side B, and side C, which is a prediction method used for conditional branch prediction and indirect branch prediction using branch pattern information, different tables for providing a taken/not taken determination), or to both the BTAC tables and the TAGE tables. Control logic provides for the evaluation of importance, opportune update times, and coordination between the branch table update and prediction logic.

Digressing briefly, and as explained at least in part above, branch predictors in one embodiment of a branch processing system include the BTAC 14, a TAGE conditional predictor, a TAGE indirect predictor, and a BTAC return stack. The return stack only needs to be updated on a misprediction, which in one embodiment is achieved via a reset of read/write pointers. Each of the predictors comprise tables (and sub-tables) that have a single port (read/write or write), but can be written independently of the other tables (and sub-tables). For instance, the BTAC 14 can be written at the same time as the conditional predictor, etc. For instance, if a branch is in side A of the BTAC 14, side A of the TAGE tables 86 may be used (if needed). The BTAC 14 comprises a master table that determines if the branch will be predicted at all (e.g., must get a hit in the BTAC), and it contains the type bits that indicate the type of branch. The BTAC 14, in one embodiment, comprises three (3) sides or tables (A, B, C, though a different number of sides may be used in some embodiments) to handle three (3) branches per fetch. Also, a separate TAGE conditional predictor exists for each of at least sides A and B (tables A and B). In some embodiments, a simpler gshare predictor may be used for side C, though in some embodiments, the TAGE conditional predictor may also be used for side C. Note that TAGE is one example prediction mechanism, and that in some embodiments, other predictors may be used, including any one or combination of global or local branch based prediction. Each TAGE conditional predictor has multiple tables (e.g., nine (9) tables for illustration, though other quantities are contemplated). Thus, in one example embodiment, there are a total of eighteen (18) TAGE conditional tables (and in some embodiments, an additional single gshare table).

In one embodiment, the write to the write queues 80 and 82 involves multiple (e.g., two (2)) writes per clock cycle, though in some embodiments, only a single branch is written during a given clock cycle. In one embodiment, the updates to the BTAC tables 84 involve a read of two (2) updates from the queues 80 and/or 82 and two writes to different sides A, B, C (no collision). In one embodiment, the updates to the TAGE tables 86 involve a read of two (2) updates from the queues 80 and/or 82 and two writes to different sides A, B, C (no collision). In some embodiments, the updates may be performed to both the BTAC tables 84 and the TAGE tables 86. Note that writes to the TAGE tables 86 and BTAC tables 84 are typically independent, but may be performed at the same time to adjust a confidence in a prediction mechanism (e.g., may involve a bias adjustment, or an indication of a less or more reliable taken or not taken determination). Note that writes may be performed to sub-tables of each of tables 84 or tables 86. Accordingly, as long as the two writes involve a different side, a different table, or a different sub-table, there is no collision. Updates may include adjustments to counters (e.g., increment for a correct prediction, decrement for an incorrect prediction, adjust a target for a misprediction, etc.). Updates may be performed at opportune times and in the case of two updates, in parallel. Opportune times may include when an array is available to write or when a write queue is reaching a predefined fullness or pendency (e.g., an update is in the queue for over, for instance, twelve (12) clock cycles). In some embodiments, the I-cache may be stalled to enable these updates. For instance, clock cycles are monitored to determine whether there is a delay or stalls in the I-cache access, such as from a snoop operation, a dead cycle, etc.

If there is a collision expected (e.g., based on recognizing updates to entries of the same table or sub-table), then the updates are prioritized (e.g., by the control logic) for the given update cycle. As an example illustration, assume the output of the branch execution units 26A and 26B comprise concurrent mispredicted branches. In one embodiment, the most important branch, for purposes of an update, is the older branch (since the younger or later branch was mispredicted off of the older one).

As another example, updates to the TAGE table 86, where collision is expected, may result in a determination that the mispredicted update is more important than the correctly predicted update (e.g., especially if the correctly prediction counter is saturated).

As another illustrative example, in certain cases (e.g., conditional branches predicted correctly), the update involves a read-modify-write update. Two of these updates may be handled per clock cycle if the branches are to different sides (e.g., A, B, C). Otherwise, the update can be queued, or one update may be discarded (or later bypassed).

Figure 3B:
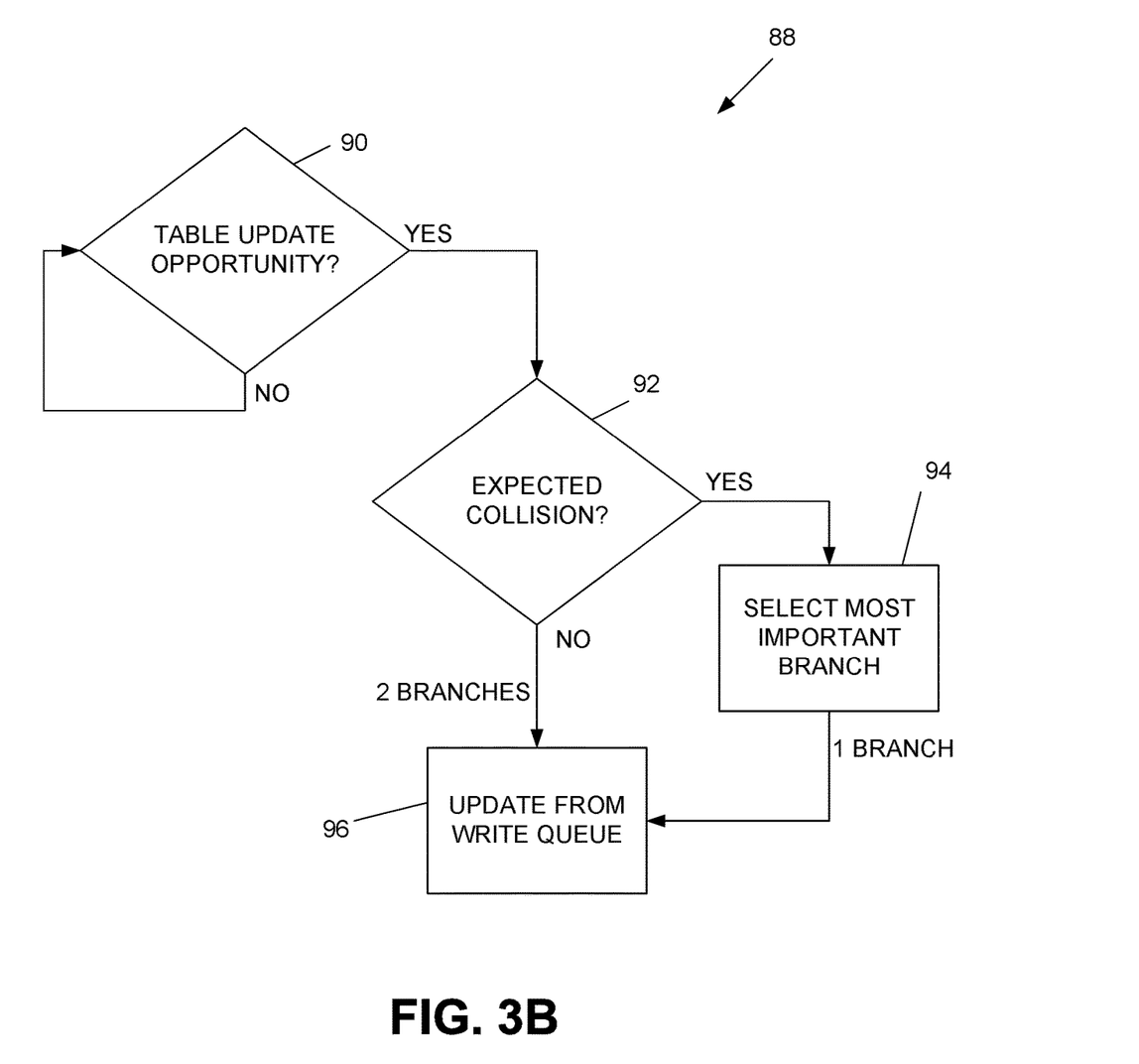
FIG. 3B is a flow diagram that shows an embodiment of an example method of dual branch updating for an embodiment of a branch processing system.

In view of the description of the dual branch updating system 76 of FIG. 3A, it should be appreciated that one embodiment of an example branch processing method, and in particular, of a method of dual branch updating, denoted as method 88 in FIG. 3B, comprises determining whether there is a table update opportunity (e.g., cache stall, queue fullness, etc.) (88). If not ("no" in 90), the monitoring continues, otherwise ("yes") a determination is made whether there is an expected collision (92). If so ("yes" to 92), then the most important branch (e.g., older, mispredicted versus predicted correctly, etc.) is selected (94) and an update to the predictor table is performed (96). Otherwise ("no" to 92), two branches are updated from the write queues (96). It should be appreciated by one having ordinary skill in the art, in the context of the present disclosure, that variations to the arrangement or order of steps are contemplated, where some steps may be performed concurrently or in a different order than depicted in FIG. 3B.

Figure 4:
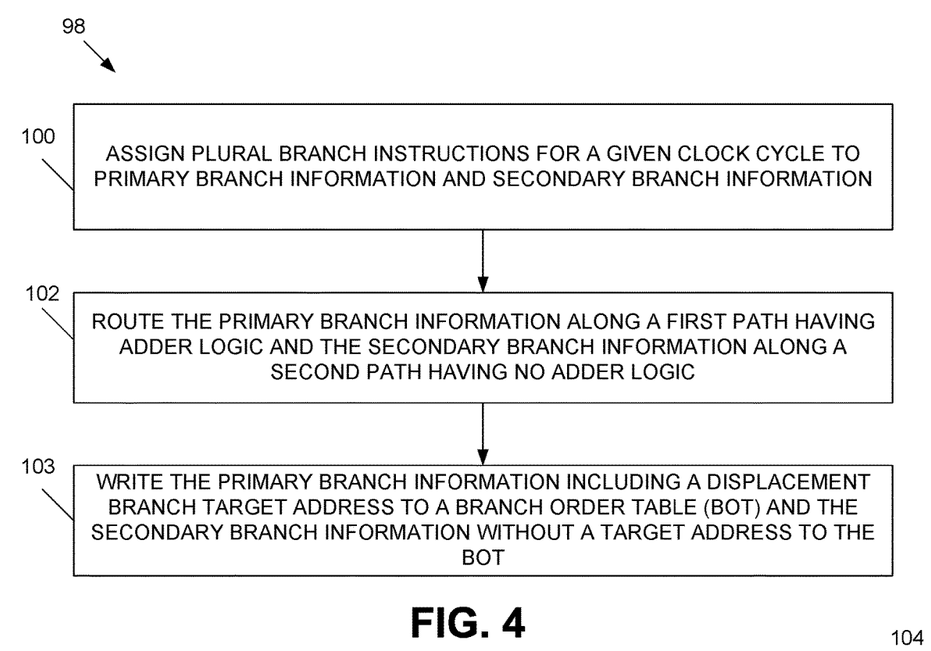
FIG. 4 is a flow diagram showing an embodiment of an example branch processing method.

Having described certain embodiments of a branch processing system, it should be appreciated that one embodiment of an example branch processing method, denoted as method 98 in FIG. 4, comprises assigning plural branch instructions for a given clock cycle to primary branch information and secondary branch information (100); routing the primary branch information along a first path having adder logic and the secondary branch information along a second path having no adder logic (102); and writing the primary branch information including a displacement branch target address to a branch order table (BOT) and the secondary branch information without a target address to the BOT (103).

Figure 5:
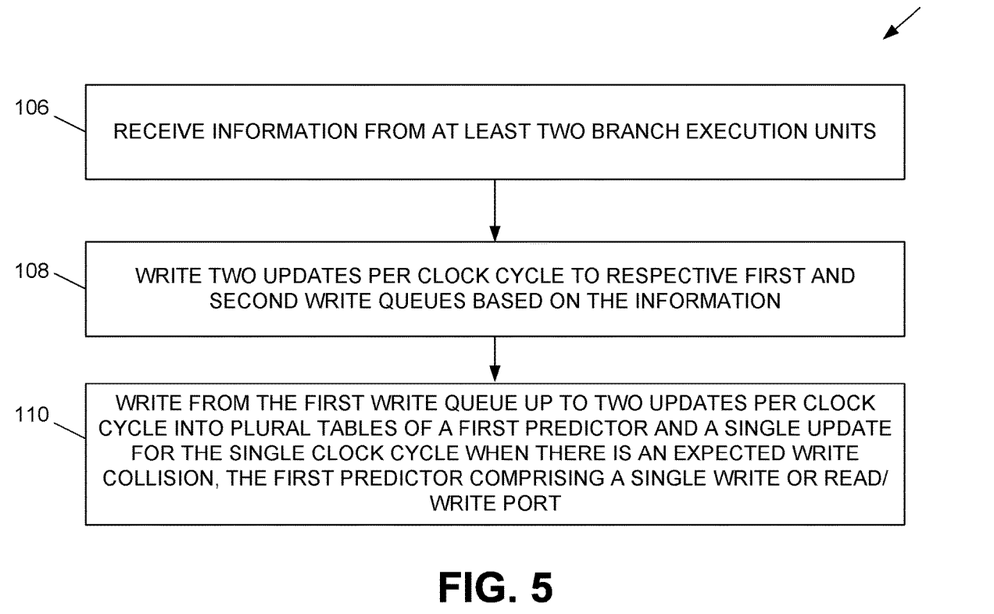
FIG. 5 is a flow diagram that shows an embodiment of another example branch processing method.

Having described certain embodiments of a branch processing system, it should be appreciated that one embodiment of another example branch processing method, denoted as method 104 in FIG. 5, comprises receiving information from at least two branch execution units (106); writing two updates per clock cycle to respective first and second write queues based on the information (108); and writing from the first write queue up to two updates per clock cycle into plural tables (e.g., sides) of a first predictor and a single update for the single clock cycle when there is an expected write collision, the first predictor comprising a single write or read/write port (110).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

The invention claimed is:

1. A microprocessor, comprising:
   instruction mux logic configured to route, for a given clock cycle, branch instructions comprising primary branch information along a first path having adder logic and secondary branch information along a second path having no adder logic;
   a decoding branch unit configured to write the primary branch information, including a displacement branch target address computed or checked along the first path, to a branch order table (BOT), and write the secondary branch information, without computing or checking a target address along the second path, to the BOT; and
   execution units configured to execute the branch instructions, wherein the execution of the branch instructions occurs subsequent to the writes to the BOT.

2. The microprocessor of claim 1, wherein the instruction mux logic operates according to a different stage than the decoding branch unit.

3. The microprocessor of claim 1, wherein the secondary branch information corresponds to a first not taken branch before another branch.

4. The microprocessor of claim 3, wherein the primary branch information corresponds to a first taken branch.

5. The microprocessor of claim 3, wherein the primary branch information corresponds to an unpredicted branch.

6. The microprocessor of claim 3, wherein the primary branch information corresponds to a second not taken branch.

7. The microprocessor of claim 1, wherein the adder logic comprises a single adder to add an instruction pointer to a displacement included in the primary branch information to derive the displacement branch target address.

8. The microprocessor of claim 7, wherein the decoding branch unit comprises comparator logic to compare the displacement branch target address that is derived to a branch target address cache (BTAC) target address stored in a BTAC to confirm the BTAC target address is correct.

9. The microprocessor of claim 8, wherein responsive to a determination that the BTAC target address is incorrect, replace a target portion of a BTAC entry with the displacement branch target address that is derived.

10. The microprocessor of claim 1, wherein the decoding branch unit is implemented in a format stage of a branch decoder.

11. The microprocessor of claim 1, wherein the decoding branch unit comprises the BOT.

12. The microprocessor of claim 1, wherein the BOT is read at an execution stage.

13. The microprocessor of claim 1, wherein the instruction mux logic is in a branch decoder.

14. A branch processing method, comprising:
   routing, for a given clock cycle, plural branch instructions comprising primary branch information along a first path having adder logic and secondary branch information along a second path having no adder logic;
   writing the primary branch information, including a displacement branch target address computed or checked along the first path, to a branch order table (BOT), and the secondary branch information, without computing or checking a target address along the second path, to the BOT; and
   executing the branch instructions at one or more execution units, wherein the executing occurs subsequent to the writing to the BOT.

15. The branch processing method of claim 14, wherein the routing is implemented by an instruction mux logic and the writing is implemented in a format stage branch decoding unit.

16. The branch processing method of claim 14, wherein the secondary branch information corresponds to a first not taken branch before another branch.

17. The branch processing method of claim 16, wherein the primary branch information corresponds to a first taken branch.

18. The branch processing method of claim 16, wherein the primary branch information corresponds to an unpredicted branch.

19. The branch processing method of claim 16, wherein the primary branch information corresponds to a second not taken branch.

20. The branch processing method of claim 14, further comprising:
- adding an instruction pointer to a displacement included in the primary branch information to derive the displacement branch target address; and
- comparing the displacement branch target address that is derived to a branch target address cache (BTAC) target address stored in a BTAC to confirm the BTAC target address is correct.

* * * * *